United States Patent
Vick et al.

(10) Patent No.: US 8,893,104 B2
(45) Date of Patent: Nov. 18, 2014

(54) METHOD AND APPARATUS FOR REGISTER SPILL MINIMIZATION

(75) Inventors: Christopher A. Vick, San Jose, CA (US); Gregory M. Wright, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 13/409,852

(22) Filed: Mar. 1, 2012

(65) Prior Publication Data

US 2013/0198495 A1   Aug. 1, 2013

Related U.S. Application Data

(60) Provisional application No. 61/591,146, filed on Jan. 26, 2012.

(51) Int. Cl.
*G06F 9/45* (2006.01)

(52) U.S. Cl.
USPC ............ 717/161; 717/150; 712/226

(58) Field of Classification Search
CPC ........................................... G06F 8/443
USPC ................... 717/140–167; 712/226–244
See application file for complete search history.

(56) References Cited

U.S. PATENT DOCUMENTS

| | | | |
|---|---|---|---|
| 5,367,651 A * | 11/1994 | Smith et al. | 717/149 |
| 5,946,491 A | 8/1999 | Aizikowitz et al. | |
| 5,987,259 A * | 11/1999 | Goebel | 717/152 |
| 7,010,787 B2 * | 3/2006 | Sakai | 717/159 |
| 7,624,388 B2 * | 11/2009 | Hsieh et al. | 717/154 |
| 7,962,907 B2 | 6/2011 | Martin et al. | |
| 2004/0103410 A1 * | 5/2004 | Sakai | 717/146 |
| 2005/0071607 A1 * | 3/2005 | Muthukumar | 712/227 |
| 2005/0102494 A1 | 5/2005 | Grochowski et al. | |
| 2007/0124722 A1 | 5/2007 | Gschwind et al. | |
| 2007/0256066 A1 * | 11/2007 | Nakaike et al. | 717/158 |
| 2008/0005722 A1 | 1/2008 | Matsuzaki | |
| 2008/0127150 A1 * | 5/2008 | Duffy et al. | 717/159 |
| 2009/0044049 A1 | 2/2009 | Luick | |
| 2009/0064112 A1 * | 3/2009 | Inagaki et al. | 717/140 |
| 2010/0199270 A1 * | 8/2010 | Baev | 717/157 |

(Continued)

OTHER PUBLICATIONS

Bernstein, David, et al. "Spill code minimization techniques for optimizing compliers." ACM SIGPLAN Notices. vol. 24. No. 7. ACM, 1989, pp. 258-263.*

(Continued)

*Primary Examiner* — Satish Rampuria
(74) *Attorney, Agent, or Firm* — Nicholas A. Cole

(57) ABSTRACT

The aspects enable a computing device to allocate memory space to variables during runtime compilation of a software application. A compiler may be modified to identify operations that can be performed on either a main pipe or an alternative pipe, identify chains of related operations that can be performed on either the main pipe or the alternative pipe, identify points in the execution of code at which the number of live values will exceed the number of registers, and choosing a chain of operations as a candidate to be moved to the alternative pipe in order to reduce the number of live values at identified points in the execution of code. The entire chosen chain of operations may be moved to the alternative pipe. The alternative pipe may perform the computations and return the results to the main pipe for execution.

24 Claims, 7 Drawing Sheets

(56) References Cited

U.S. PATENT DOCUMENTS

2011/0004741 A1   1/2011   Lu et al.
2011/0138372 A1   6/2011   Damron
2011/0161945 A1   6/2011   Kalogeropulos et al.
2011/0258616 A1*  10/2011  Sollich .......................... 717/146

OTHER PUBLICATIONS

Goodman, James R., and W-C. Hsu. "Code scheduling and register allocation in large basic blocks." Proceedings of the 2nd international conference on Supercomputing. ACM, 1988, pp. 442-452.*

Zalamea, Javier, et al. "Modulo scheduling with integrated register spilling for clustered VLIW architectures." Proceedings of the 34th annual ACM/IEEE international symposium on Microarchitecture. IEEE Computer Society, 2001. pp. 160-169.*

International Search Report and Written Opinion—PCT/US2013/020642—ISA/EPO—Apr. 3, 2013.

* cited by examiner

METHOD AND APPARATUS FOR REGISTER SPILL MINIMIZATION

RELATED APPLICATIONS

This application claims the benefit of priority to U.S. Provisional Application No. 61/591,146, entitled "Method and Apparatus for Register Spill Minimization" filed Jan. 26, 2012, which is hereby incorporated by reference in its entirety.

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. With this increase in processing speed, usage, and performance, there is an increased demand for improving the efficiency and processing speed of the mobile devices, which may be achieved via faster and more sophisticated compilers and compiling frameworks.

Generally, application software written for mobile computing devices is compiled into executable code which is what users refer to as "applications." Developers typically use a compiler to translate code written in higher level programming languages into executable code suitable for target mobile computing devices. Application software may be distributed as pure executable code, in which case the compiling step is typically performed by the developer on what is referred to as a "static compiler." Application software may also be written so portions of the code are compiled at runtime using software modules within the mobile computing device referred to as a "runtime compiler." Runtime compilers (e.g., dynamic compilers or Just in Time compilers) translate segments of code into executable native code (e.g., machine code) at the time the code is executed.

SUMMARY

The various aspects include a compiler method implemented within a compiler on a computing device for reducing register events. In aspect a method of identifying processor operations that may be performed on either a main pipe or an alternative pipe of a computing device includes identifying chains of related operations that may be performed on either the main pipe or the alternative pipe, identifying points in the execution of code at which the number of live values will exceed the number of available registers in the main pipe, choosing a chain of operations as a candidate to be moved to the alternative pipe in order to reduce the number of live values at identified points in the execution of code that compete for registers in the main pipe, and generating instructions for the chosen chain of operations for execution on either the main pipe or the alternative pipe. In an aspect, the method may include generating pseudo instructions that enable later generation of instructions for execution on the main pipe or instructions for execution on the alternative pipe, and generating instructions for the main pipe from the pseudo instructions. In a further aspect, the method may include generating pseudo instructions that enable later generation of instructions for execution on the main pipe or instructions for execution on the alternative pipe, and generating instructions for the alternative pipe from the pseudo instructions. In a further aspect, the method may include generating pseudo instructions that enable later generation of instructions for execution on the main pipe or instructions for execution on the alternative pipe, and selecting instructions to be generated, in which generating pseudo instructions that enable later generation of instructions for execution on the main pipe or instructions for execution on the alternative pipe and the selection of which instructions are to be generated is performed as part of a register allocation process. In a further aspect, the method may include computing costs of performing each chain of operations on the alternative pipe. In a further aspect, choosing a chain of operations as a candidate to be moved to the alternative pipe may include identifying live values associated with candidate chains of operations, and choosing among the chains of operations associated with a live value based upon the computed costs. In a further aspect, the alternative pipe may be a single instruction multiple data (SIMD) unit. In a further aspect, the method may include repeating operations of choosing a chain of operations to move to the alternative pipe until the number of simultaneous live values on the main pipe no longer exceeds the number of registers in the main pipe.

Further aspects include a computing device that includes means for identifying operations that may be performed on either a main pipe or an alternative pipe, means for identifying chains of related operations that may be performed on either the main pipe or the alternative pipe, means for identifying points in the execution of code at which the number of live values will exceed the number of available registers in the main pipe, means for choosing a chain of operations as a candidate to be moved to the alternative pipe in order to reduce the number of live values at identified points in the execution of code which compete for registers in the main pipe, and means for generating instructions for the chosen chain of operations for execution on either the main pipe or the alternative pipe. In an aspect, the computing device may include means for generating pseudo instructions that enable later generation of instructions for execution on the main pipe or instructions for execution on the alternative pipe, and means for generating instructions for the main pipe from the pseudo instructions. In a further aspect, the computing device may include means for generating pseudo instructions that enable later generation of instructions for execution on the main pipe or instructions for execution on the alternative pipe, and means for generating instructions for the alternative pipe from the pseudo instructions. In a further aspect, the computing device may include means for generating pseudo instructions that enable later generation of instructions for execution on the main pipe or instructions for execution on the alternative pipe, and means for selecting which instructions are to be generated. In a further aspect, the computing device may include in which means for generating pseudo instructions that enable later generation of instructions for execution on the main pipe or instructions for execution on the alternative pipe and means for selecting which instructions are to be generated comprise means for generating and selecting instructions as part of a register allocation process. In a further aspect, the computing device may include means for computing costs of performing each chain of operations on the alternative pipe, In a further aspect, means for choosing a chain of operations as a candidate to be moved to the alternative pipe may include means for identifying live values associated with candidate chains of operations, and means for choosing among the chains of operations associated with a live value based upon the computed costs. In a further aspect, means for choosing a chain of operations as a candidate to be moved to the alternative pipe may include means for choosing a chain of operations as a candidate to be moved to a single instruction multiple data (SIMD) unit. In a further aspect, the computing device may include means for repeating operations of choosing a chain of operations to move to the alternative pipe until the number of simultaneous live values on the main pipe no longer exceeds the number of registers in the main pipe.

Further aspects include a computing device that includes a processor configured with processor-executable instructions to perform operations that may include identifying operations that may be performed on either a main pipe or an alternative pipe, identifying chains of related operations that may be performed on either the main pipe or the alternative pipe, identifying points in the execution of code at which the number of live values will exceed the number of available registers in the main pipe, choosing a chain of operations as a candidate to be moved to the alternative pipe in order to reduce the number of live values at identified points in the execution of code which compete for registers in the main pipe, and generating instructions for the chosen chain of operations for execution on either the main pipe or the alternative pipe. In an aspect, the processor is configured with processor-executable instructions to perform operations that may further include generating pseudo instructions that enable later generation of instructions for execution on the main pipe or instructions for execution on the alternative pipe, and generating instructions for the main pipe from the pseudo instructions. In a further aspect, the processor is configured with processor-executable instructions to perform operations that may further include generating pseudo instructions that enable later generation of instructions for execution on the main pipe or instructions for execution on the alternative pipe, and generating instructions for the alternative pipe from the pseudo instructions. In a further aspect, the processor is configured with processor-executable instructions to perform operations that may further include generating pseudo instructions that enable later generation of instructions for execution on the main pipe or instructions for execution on the alternative pipe, and selecting instructions to be generated, in which generating pseudo instructions that enable later generation of instructions for execution on the main pipe or instructions for execution on the alternative pipe and the selection of which instructions are to be generated are performed as part of a register allocation process. In a further aspect, the processor is configured with processor-executable instructions to perform operations that may further include computing costs of performing each chain of operations on the alternative pipe, and in which the processor is configured with processor-executable instructions such that choosing a chain of operations as a candidate to be moved to the alternative pipe may include identifying live values associated with candidate chains of operations, and choosing among the chains of operations associated with a live value based upon the computed costs. In a further aspect, the processor is configured with processor-executable instructions such that generating instructions for the chosen chain of operations for execution on either the main pipe or the alternative pipe may include generating instructions for the chosen chain of operations for a single instruction multiple data (SIMD) unit. In a further aspect, the processor is configured with processor-executable instructions to perform operations that may further include repeating operations of choosing a chain of operations to move to the alternative pipe until the number of simultaneous live values on the main pipe no longer exceeds the number of registers in the main pipe.

Further aspects include a non-transitory computer readable storage medium having stored thereon processor-executable instructions configured cause a computing device to perform operations that may include identifying operations that may be performed on either a main pipe or an alternative pipe, identifying chains of related operations that may be performed on either the main pipe or the alternative pipe, identifying points in the execution of code at which the number of live values will exceed the number of available registers in the main pipe, choosing a chain of operations as a candidate to be moved to the alternative pipe in order to reduce the number of live values at identified points in the execution of code which compete for registers in the main pipe, and generating instructions for the chosen chain of operations for execution on either the main pipe or the alternative pipe. In an aspect, the stored processor-executable instructions may be configured to cause a processor to perform operations including generating pseudo instructions that enable later generation of instructions for execution on the main pipe or instructions for execution on the alternative pipe, and generating instructions for the main pipe from the pseudo instructions. In a further aspect, the stored processor-executable instructions may be configured to cause a processor to perform operations including generating pseudo instructions that enable later generation of instructions for execution on the main pipe or instructions for execution on the alternative pipe, and generating instructions for the alternative pipe from the pseudo instructions. In a further aspect, the stored processor-executable instructions may be configured to cause a processor to perform operations including generating pseudo instructions that enable later generation of instructions for execution on the main pipe or instructions for execution on the alternative pipe, and selecting which instructions are to be generated, in which generating pseudo instructions that enable later generation of instructions for execution on the main pipe or instructions for execution on the alternative pipe and the selection of which instructions are to be generated is performed as part of a register allocation process. In a further aspect, the stored processor-executable instructions may be configured to cause a processor to perform operations including computing costs of performing each chain of operations on the alternative pipe, and the stored processor-executable instructions are configured to cause a processor to perform operations such that choosing a chain of operations as a candidate to be moved to the alternative pipe may include identifying live values associated with candidate chains of operations, and choosing among the chains of operations associated with a live value based upon the computed costs. In a further aspect, the stored processor-executable instructions may be configured to cause a processor to perform operations such that generating instructions for the chosen chain of operations for execution on either the main pipe or the alternative pipe may include generating instructions for the chosen chain of operations for execution on a single instruction multiple data (SIMD) unit. In a further aspect, the stored processor-executable instructions may be configured to cause a processor to perform operations including repeating operations of choosing a chain of operations to move to the alternative pipe until the number of simultaneous live values on the main pipe no longer exceeds the number of registers in the main pipe.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
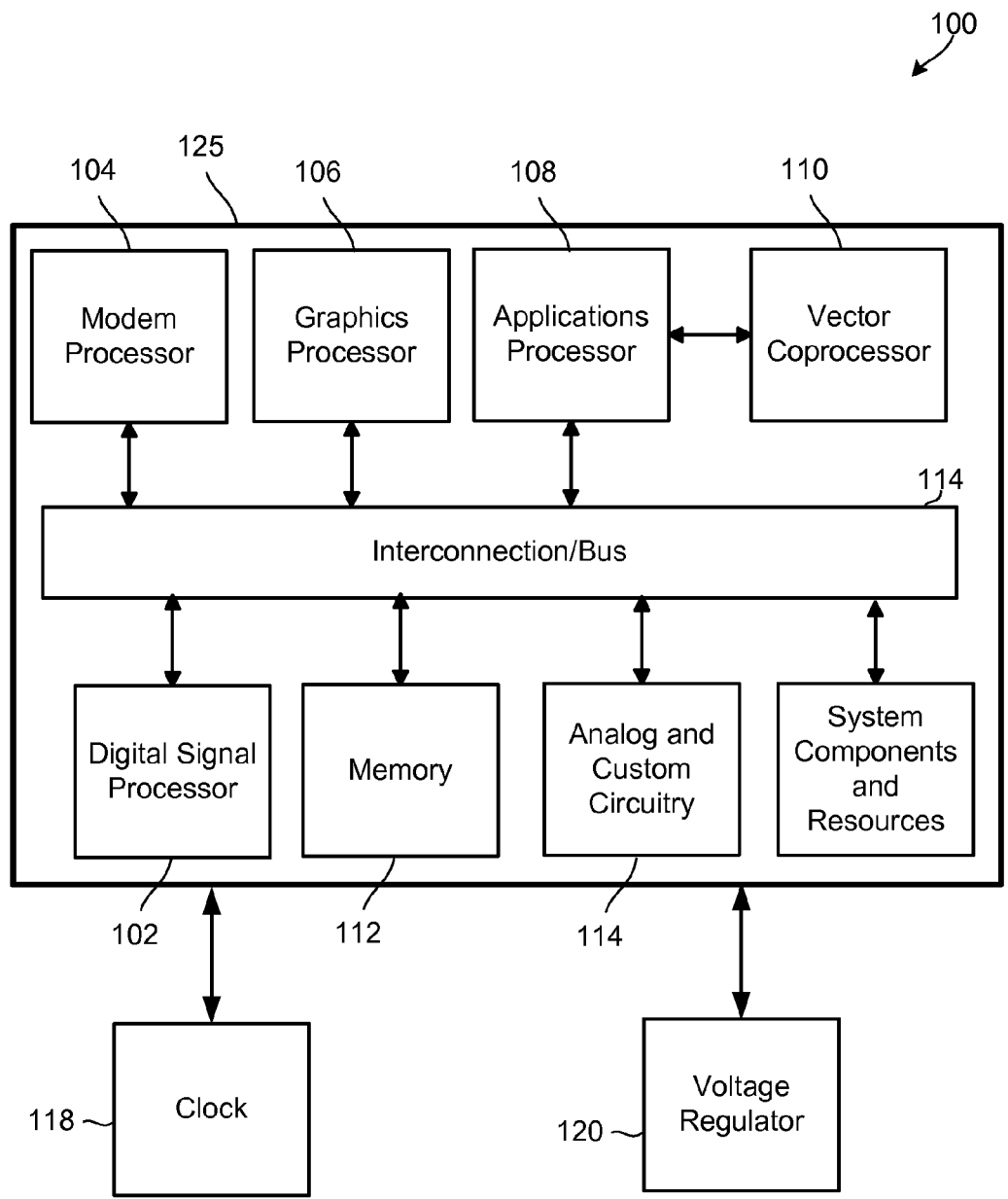
FIG. 1 is an architectural diagram illustrating hardware components of a computing device suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device" and "receiver device" are used interchangeably herein to refer to any one or all of cellular telephones, smartphones, personal or mobile multi-media players, personal data assistants (PDA's), laptop computers, tablet computers, smartbooks, palm-top computers, wireless electronic mail receivers, multimedia Internet enabled cellular telephones, wireless gaming controllers, and similar personal electronic devices which include a memory, a programmable processor for which performance is important, and may operate under battery power such that power conservation methods are of benefit. While the various aspects are particularly useful in mobile devices, such as cellular telephones, which have limited processing power, the aspects are generally useful in any computing device that includes a processor and executes scripts and application programs.

The term "single instruction multiple data" and its acronym "SIMD" are used herein to refer to a processor architecture that includes multiple processing elements for simultaneously performing the same operation on multiple data streams. Many modern computing devices include SIMD processors, SIMD registers, and/or one or more multiple instruction, multiple data (MIMD) processors configured execute short-vector SIMD instructions. Moreover, SIMD operations are supported by a number of computer architectures, including CISC/Intel x86 (e.g., Intel 64, IA-32) and RISC/ARM. Examples of SIMD instruction set extensions include Advanced Vector Extension (AVX) for the x86/CISC architectures and NEON for the ARM/RISC architectures.

The term "multicore processor" is used herein to refer to a single integrated circuit (IC) chip or chip package that contains two or more independent processing cores (e.g., CPU cores) configured to read and execute program instructions. A "system on chip" (SOC) may include multiple multicore processors, and each processor in an SOC may be referred to as a core. A single SOC may contain circuitry for digital, analog, mixed-signal, and radio-frequency functions. A single SOC may also include any number of general purpose and/or specialized processors (DSP, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The phrases "legal set" and "legal register set" are used interchangeably herein to refer to a set of registers in the computing device that a particular variable is allowed to use. Some operations may place restrictions on the types or identity of registers that may be used, while other operations may place no restrictions on the registers (i.e., any available register may be used).

Register allocation is a compiler process that assigns code segment variables (referred to as "values" or "value data structures") to hardware registers during program execution. Assigning values to hardware registers is an important compiler operation because processors are able to access values assigned to hardware registers much faster than values stored in non-register memories. A code segment may include far more values than there are available hardware registers, in which case multiple values may be assigned to a single register and/or the values may be "spilled" to (i.e., stored in) alternative locations (e.g., cache memory, disk storage, etc.). These "register spilling" operations require storing values at "definition points", and loading the stored values at "use points." These load/store operations increase memory traffic, introduce latency, and increase the amount of energy consumed by the computing device.

The various aspects minimize the number of load and store operations required to correctly allocate registers for a compilation unit, thereby improving the energy consumption characteristics and performance of computing devices executing the applications compiled using the aspect methods. The various aspects move entire sequences of computations to alternative processing pipelines to free up processing and memory resources on the main pipeline and to reduce/eliminated register spill operations.

Many modern microprocessor architectures (e.g., ARM) have a limited register set and rely on extra circuitry/processors/coprocessors for storing certain values and/or performing certain computations. ARM processors may include a NEON SIMD engine, which is a 128 bit single instruction multiple data (SIMD) instruction set architecture extension designed to accelerate multimedia applications. SIMD extensions may include a comprehensive instruction set, separate register files, and independent execution hardware. The SIMD extensions may provide extra processing pipelines (e.g., additional fetch, execute, decode pipelines) having hardware registers that are separate and distinct from the hardware registers of the main processing pipeline.

Existing compiler optimization techniques utilize SIMD extensions to reduce the amount of workload placed on the main processing pipeline by enabling the main processor to copy code segment variables (values) directly into the hardware registers of the SIMD pipelines. However, performing such copy operations between pipelines is often slower than copying the variables to the memory (e.g., an L1 cache memory) as part of the register spill operation.

Unlike existing solutions, the various aspects move entire sequences of computation from the main processing pipeline to one of the alternative pipelines (e.g., SIMD pipeline). For example, in an aspect, a compiler may be configured to select one or more portions of an application program, evaluate one or more available processing pipelines to identify the capabilities of alternative pipelines, identify the operations (e.g., adds, divides, etc.) required by the selected portions, and shift an entire selected portion (e.g., sequences of computations) to an alternative pipeline determined to be capable of performing the necessary operations. Moving the entire sequence of computations frees up hardware registers on the main pipeline, and reduces/eliminates the number of store and load operations required to assign values to registers or to move the values between pipelines. The alternative pipeline may perform the sequence of computations and return the results to the main processing pipeline.

The various aspects may be implemented on compilers used to compile application software which executes on a wide variety of computer architectures, an example of which is illustrated in FIG. 1. Specifically, FIG. 1 illustrates that a computing device 100 may include a number of heterogeneous processors, such as a digital signal processor (DSP) 102, a modem processor 104, a graphics processor 106, and an application processor 108. The computing device 100 may also include one or more vector coprocessors 110 (e.g., NEON, etc.) connected to one or more of the processors. Each processor may include one or more cores, and each processor/core may perform operations independent of the other processors/cores. In an aspect, various computing device 100 components may be located on a single substrate, or as a system-on-chip (SOC) 125.

The computing device 100 may also include analog circuitry and custom circuitry 114 for managing sensor data, analog-to-digital conversions, wireless data transmissions, and performing other specialized operations, such as processing encoded audio signals for games and movies. The computing device 100 may further include system components and resources 116, such as voltage regulators, oscillators, phase-locked loops, peripheral bridges, data controllers, memory controllers, system controllers, access ports, timers, and other similar components used to support the processors and clients running on a computing device.

The computing device 100 may include an input/output module (not illustrated) for communications between components and resources, such as a clock 118 and a voltage regulator 120. The processors 102, 104, 106, 108 may be interconnected to one or more memory elements 112, system components, and resources 116 and custom circuitry 114 via an interconnection/bus module.

As mentioned above, modern microprocessor architectures (e.g., ARM) may rely on extra processors/coprocessors for storing values and/or performing certain computations, such as the vector coprocessor 110 illustrated in FIG. 1. In an aspect, the vector coprocessor may implement a single instruction multiple data (SIMD) instruction set architecture (ISA) that includes an independent hardware registers and execution hardware. SIMD vector coprocessors are useful for processing applications that require fast and parallel execution, such as multimedia applications. In an aspect, SIMD vector coprocessor may be utilized to offload entire sequences of instructions from the main pipeline. In an aspect, the SIMD vector coprocessor may be a part of, or closely coupled to, the main processor.

Figure 2:
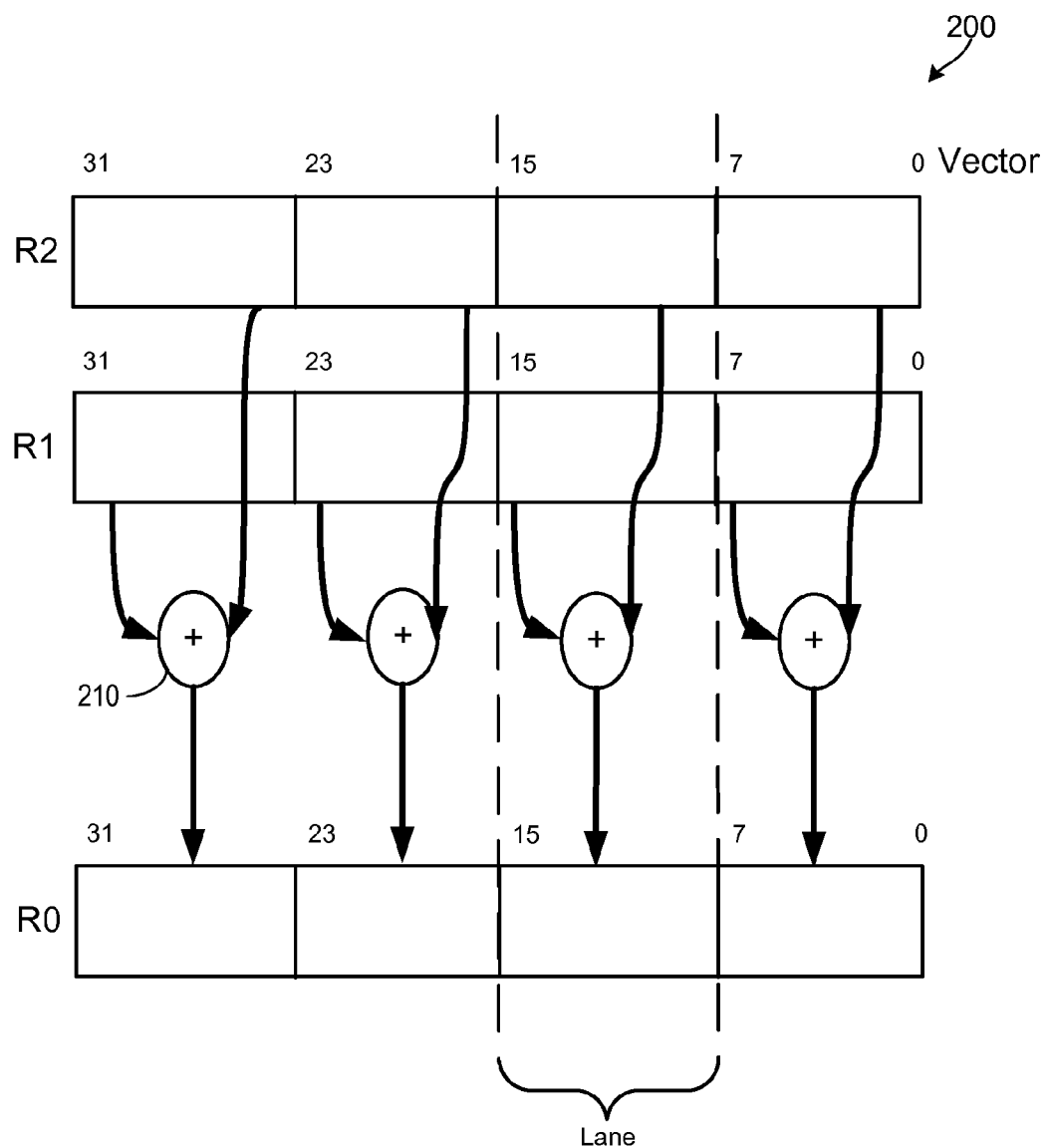
FIG. 2 is a component block diagram of an example single instruction multiple data (SIMD) system suitable for use with the various aspects.

FIG. 2 is an architectural diagram illustrating logical elements in an example SIMD system 200 suitable for performing a sequence of instructions to avoid register spill situation according to the various aspects. The SIMD system 200 may include hardware registers R0, R1, R2, and multiple processing units 210 (e.g., ADDERS) for manipulating the values of the hardware registers R0, R1, R2. A hardware register is a location associated with a processor that may be accessed faster than the other memories (e.g., stack, heap, etc.) available to the processor. The hardware registers may include an instruction pool and a data pool. In the illustrated example of FIG. 2, logical elements 200 include a 32 bit registers R1 and R2 holding input data values, multiple adders 210 for the parallel addition of four lanes of 8-bit elements, and a 32 bit register R0 for storing the results of the add operations.

The various aspect methods may be implemented in static compilers and runtime compilers. When implemented in a static compiler, the aspect methods may be implemented within the compiler software executing on a server or work station that software developers may use to compile application software. Such static compilers will produce executable code which when activated on a target computing device (i.e., the type of computing device and operating system for which the code was compiled) will minimize register spill operations by performing selected instruction sequences on a second processor (e.g., a SIMD) instead of the CPU.

When implemented in a runtime compiler, the aspect methods may perform in a similar manner in order to generate at run time executable code that is then executed on computing device. Such runtime compilers will similarly produce executable code at run time that minimizes register spill operations by performing selected instruction sequences on a second processor (e.g., a SIMD) instead of the CPU.

Figure 3:
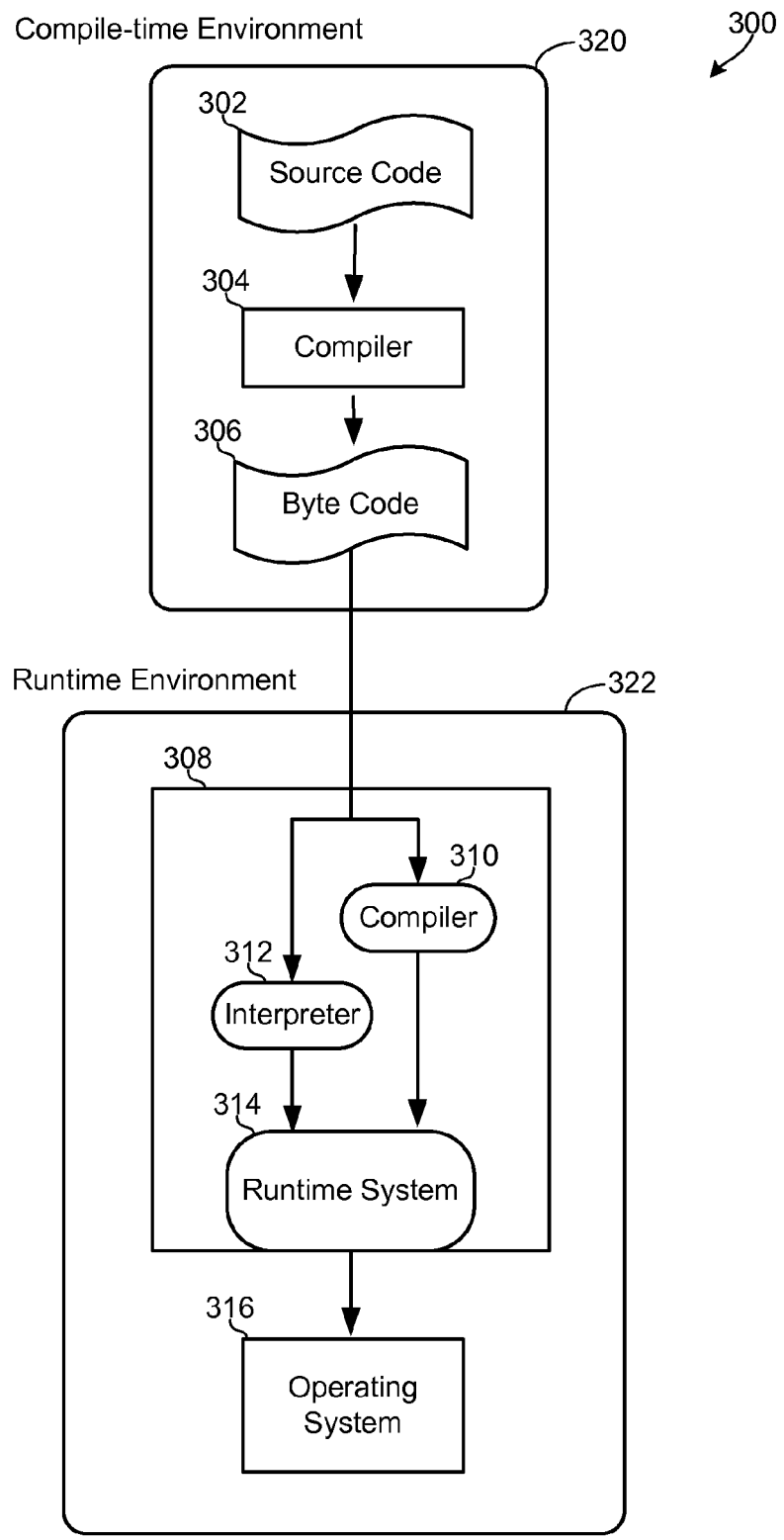
FIG. 3 is an illustration of the logical components and information flows in computing system suitable for implementing the various aspects

FIG. 3 illustrates information flows in an example virtual machine 308 of a computing system 300 having a vector coprocessor suitable for implementing the various aspects. In the illustrated example, when a computer program is executed, source code 302 written in a high level language is provided to a compiler module 304 within a compile-time environment 320, which translates the source code 302 into byte code 306. The source code 302 may also be translated into the byte code 306. The generated byte code 306 may be generated such that it may be distributed to a wide variety of mobile devices having different platforms and execution environments, so long as the mobile devices include virtualization software that supports the instruction set architecture (ISA) used to generate the bytecode 306 (i.e., the generated byte code 306 may be platform independent).

The computing system 300 may also include a runtime environment 322 that includes a virtual machine 308 and an operating system 316. The virtual machine 308 may be a software application that executes application programs like a physical hardware machine. The virtual machine 308 provides an interface between the application programs and the physical hardware, potentially allowing application programs tied to a specific instruction set architecture to execute on hardware implementing a different instruction set architecture. In the illustrated example of FIG. 3, the virtual machine 308 includes a runtime compiler 310, an interpreter 312, and a runtime system 314.

Byte code 306 generated by the compile time environment 320 may be provided to the either the runtime compiler 310 or the interpreter 312 of the virtual machine 308. If the byte code 306 is provided to the interpreter 312, the byte code may be read and executed "as is." If, on the other hand, the byte code 306 is provided to compiler 310, the methods and procedures stored by the byte codes may be optimized and compiled into machine instructions. In an aspect, the runtime system 314 may determine whether the an interpreted method or a compiled method is required, and if a compiled method is required, activate the runtime compiler 310 to perform register allocation operations that assign variables to the physical hardware registers. If a compiled method is not required, the static compiler 304 may perform register allocation operations that assign variables to the physical hardware registers.

Compiler operations may include instruction set selection, scheduling, and register allocation. A register allocator process may control the use of registers within an optimized or otherwise compiled program by allocating the register space in which data associated with the program may be stored. As mentioned above, on architectures having a limited register set, mapping the values to the hardware registers is a computationally intensive task. The various aspects reduce these complexities by moving selected code segments to alternative pipelines in the presence of register spillover, thereby maximizing the utilization of all available registers sets. The various aspects may be implemented as part of the runtime compiler 310, the static compiler 304, or both. The various aspects methods may be performed after the code has been optimized (e.g., after the removal of unnecessary instructions, unrolling of loops, etc.), at the very end of the code generation stage and/or prior to register assignment.

Figure 4:
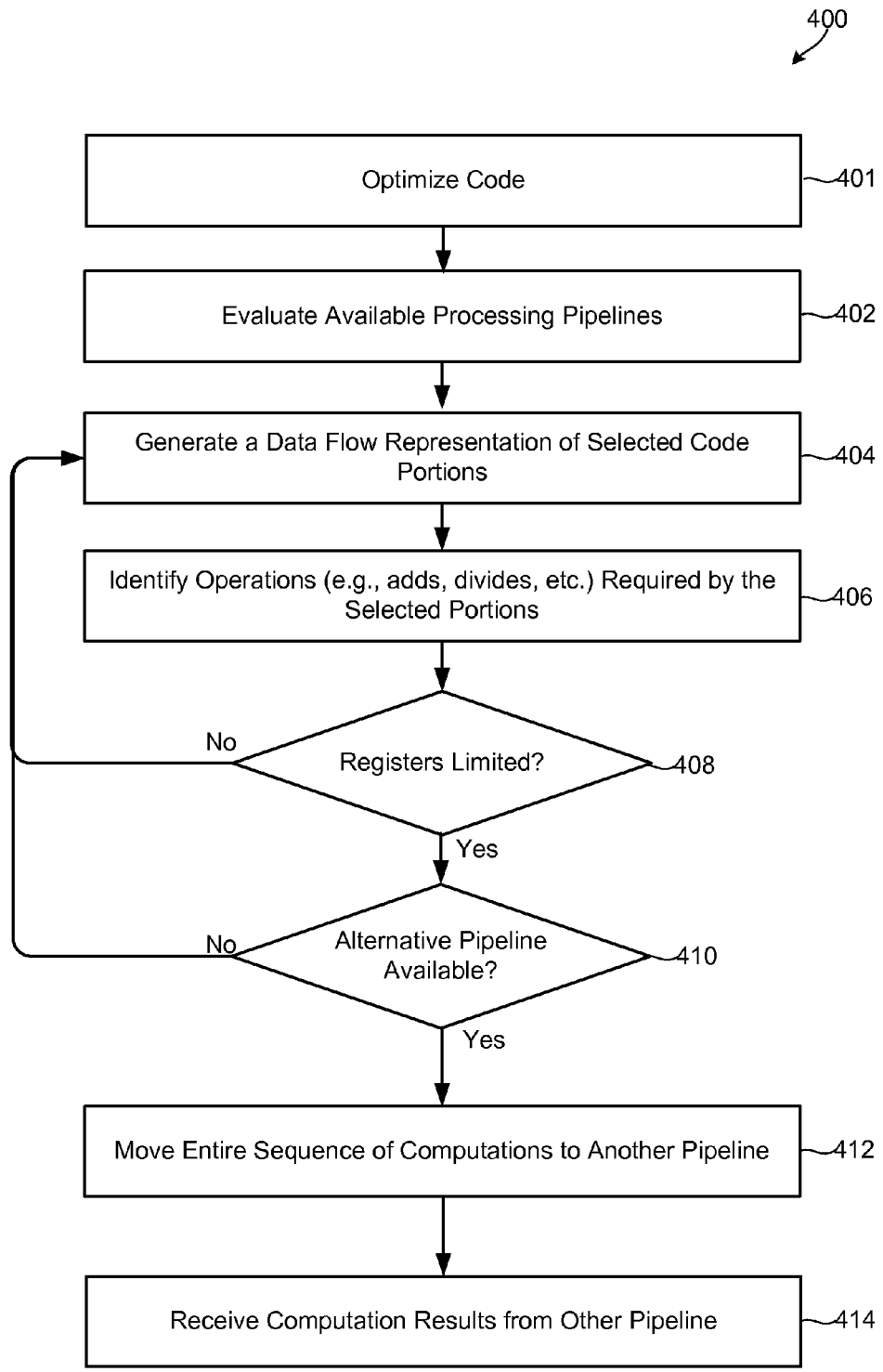
FIG. 4 is a process flow diagram of aspect method for moving selected code segments to alternative pipelines in the presence of register spillover.

FIG. 4 illustrates an aspect method 400 for moving selected code segments to alternative pipelines in the presence of register spillover. In block 401, a compiler process may perform code optimization operations (e.g., remove unnecessary instructions, unroll of loops, etc.) on an application program code. In block 402, the compiler process may evaluate available processing pipelines (e.g., CPU pipeline, SIMD pipeline, auxiliary pipeline, etc.) to identify the operations that each pipeline is capable of performing. In block 404, the compiler may generate a data flow representation of relevant portions of the application program. In block 406, the data flow representation may be used to identify the operations (e.g., adds, divides, etc.) required by the evaluated portions. In determination block 408, the compiler may determine if the number of available registers is limited and/or if register spill operations are required. If it is determined that the number of available registers is limited (i.e., determination block 408="Yes"), in determination block 410, the compiler may determine if a particular sequence of operations may be performed by another processor pipeline (e.g., SIMD pipeline). If it is determined that a particular sequence of computations may be performed by another processor pipeline (i.e., determination block 410="Yes"), in block 412, the entire sequence of computations may be shifted to one of the other processors deemed capable of performing the necessary operations. In block 414, the main processing pipeline may receive the results of the sequence of computations.

As mentioned above, compiler operations may include instruction set selection, scheduling, and register allocation. Generally, the scheduling and register allocation operations cannot be performed until after the compiler generates a representation in the instruction set for a specific hardware architecture, at which point the operations must be performed on the selected hardware architecture. To overcome this, the various aspects generate pseudo-instructions capable of representing instructions for each of the pipelines that may be selected to perform the sequence of computations. The pseudo-instructions enable the compiler process to choose an actual instruction set during or after the register allocation process.

In an aspect, an instruction selector module of a static or runtime compiler may be modified to select special pseudo instructions instead of conventional instructions (i.e., CPU pipeline instructions) for operations that can legally be performed on an alternative pipe (e.g., on a SIMD pipe). The pseudo instructions may be generated such that they are not actual instructions that may be performed on any specific target architecture, but rather, are artificial instructions capable of representing multiple different instructions (e.g., instructions for each of the pipelines on which the operations may be performed). For example, the various aspects may generate a pseudo "add" instruction that represents both an add instruction that may be performed on the main pipe (e.g., in a first ISA) and an add instruction that may be performed on the SIMD pipe (e.g., in a second ISA).

In an aspect, the generated pseudo instructions may include both a standard instruction for the main pipeline and instructions for the alternative pipeline at the instruction selection stage. This allows a decision regarding which pipe to use for performing the operation to be delayed until the register allocation stage of the compiler. Thus, in an aspect, the actual instructions may be generated during the register allocation process instead of the instruction set selection process.

In an aspect, after the instruction selection stage, the compiler may use DEF/USE or USE/DEF information generated in the compilation process to identify chains of dependent operations which could be performed on the SIMD pipe. The DEF/USE or USE/DEF information enables the compiler to understand how the values are tied together in dependent operations. These operations may identify the chains of operations that are linked together and can be performed together in the SIMD pipe.

With chains of operations that could be processed on the SIMD pipe identified, the compiler may compute the expected costs (which may be in terms of performance and power savings) associated with processing the chains of operations on the SIMD pipe. The compiler may also calculate a cost of performing the operations on the main pipe, and compare the costs of performing the operations on the main pipe with the costs of performing the operations on the SIMD pipe.

In an aspect, the register allocation process may be modified to select the pipe on which the operations chains are to be executed based upon computed costs. In certain scenarios, the performance and power savings costs of executing the operations chains may be lower on the main pipe. For example, performing the chains of operations on the SIMD pipe may be slower, in part because it involves the extra blocks of moving the operations to the SIMD pipe and moving the results back to the main pipe when completed. However, even in such cases, the relative costs of moving the chain of operations to the SIMD pipe may be less over the long term if multiple register spill operations are required.

In an aspect, the register allocator may select the main pipe for executing operation chains if it is determined to be the most efficient pipe in terms of performance and power consumption. However, when the number of live values exceeds the number of registers, execution of the operations on the main pipe may require the delay and extra power consumption of value reads and writes (loads/stores) associated with register spill. In such situations, the register allocator may determine whether the costs of moving the chain of operations to the SIMD pipe will be less than the performance and power drain costs of using register spill to execute the chain of operations on the main pipe. If the register allocator determines that there is a performance benefit to be had by moving the computations off the main pipeline, the register allocator may move the chain to the SIMD pipeline.

In an aspect, the register allocator may discover points in the execution of compiled code at which there will be more simultaneously live values than there are available architectural registers. That is, the register allocator may identify the places in the execution of code where there is too much register pressure. This many be done in a single process (so that all such points are identified before registers are allocated) or may be done as the allocator works its way through the code (i.e., as such points are encountered in the register allocation process). If the points are identified at the same time (e.g., single process), the register allocator may select one of the points where the live values will exceed the number of registers in order to process the points in a loop. In an aspect in which the points are addressed as they are encountered (e.g., as the allocator works through the code), the loop may encompass the register allocation process.

At each point where the live values exceed the available registers, the register allocator may determine whether any of those live values are associated with or part of a candidate chain of operations (i.e., a chain of operations which can be executed on either the main pipe or the SIMD pipe). If any live values are associated with a candidate chain of operations, the allocator may use the computed costs of moving the operations to the SIMD pipe (or the relative costs of performing operations on the SIMD pipe versus the main pipe) in order to choose the best chain of operations (in terms of total costs, cost savings, etc.) for relocation to the SIMD pipe.

Chains of operations chosen to be shifted to the SIMD pipe may be moved to the selected pipeline by tagging the values and resetting their legal register set to the SIMD registers. This operation may also include using the generated pseudo instructions to select the SIMD instructions for execution. In an aspect, the instruction generation may be accomplished at later point in the process.

In an aspect, the operations for choosing chains of operations to be moved to the SIMD pipeline may be repeated for other values associated with candidate chains of operations in order to move more chains of operations to the SIMD pipe, further reducing register pressure. In an aspect, these operations may be repeated until the register pressure is completely relieved. In an aspect, these operations may be repeated until the number of simultaneously live values in the main pipe is less than the number of available registers. In an aspect, these operations may be repeated until all registers in the SIMD registers are fully subscribed. In an aspect, these operations may be repeated until there are no more points at which the number of simultaneously live values exceeds the number of architecture registers.

If, at any stage, the register allocator determines that further chains may not be moved to the SIMD pipe, conventional register spill operations (i.e., loading an address pointer in the register and inserting memory load and store instructions in place of register operations) may be performed to handle the remaining live values.

In an aspect, each chain of operations moved to the SIMD may reduce the number of operations by at least one load value and one store value. Since the number of cycles associated with each load and each store operation are significant and greater than the SIMD operations, the various aspects provide net savings in terms of the operation cycles. Moreover, since memory references (i.e., load and store operations) are more power intensive than operations on the SIMD pipe, the various aspects provide net power savings by moving the operations to avoid conducting the memory load and store processes.

Figure 5:
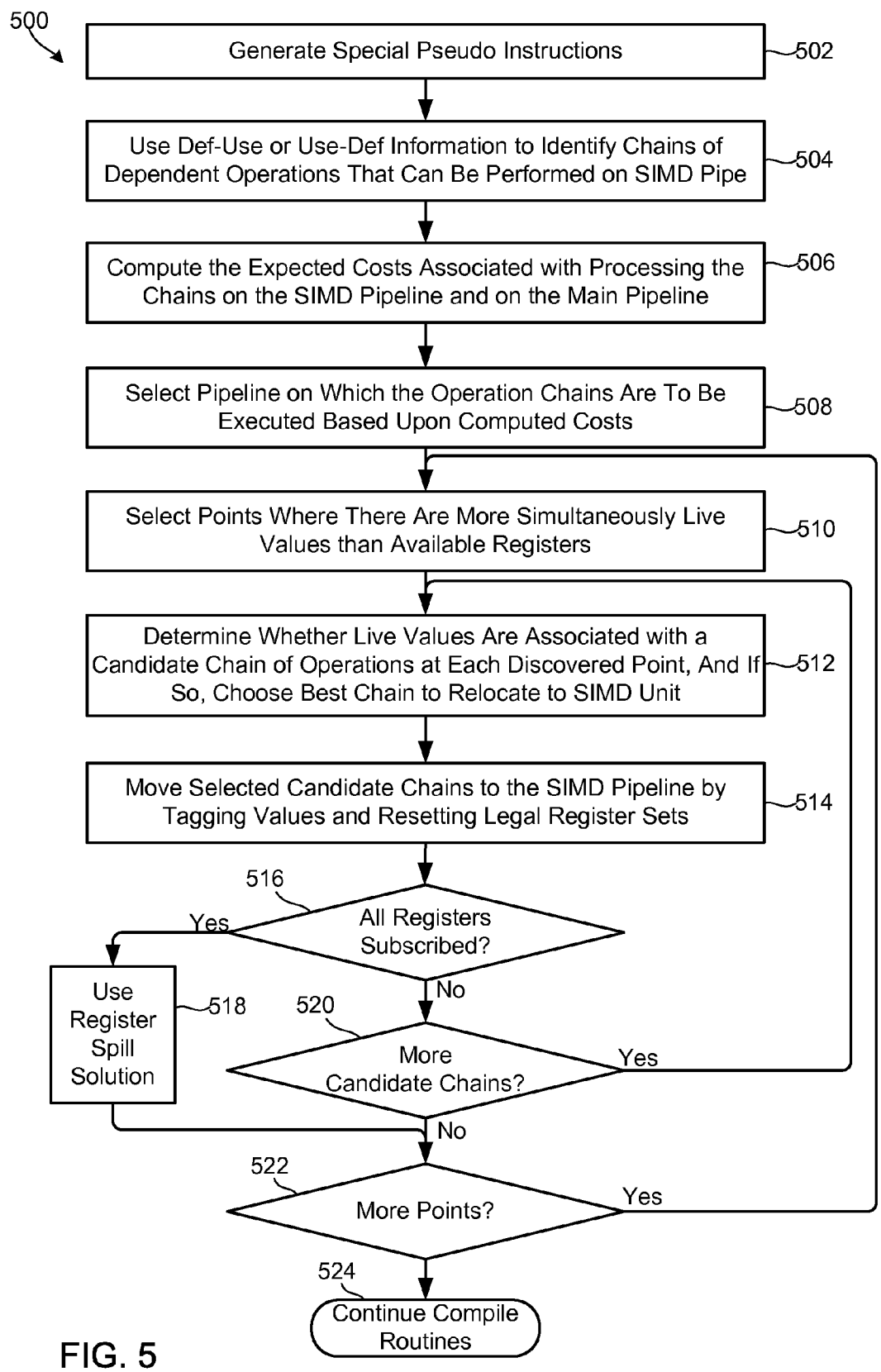
FIG. 5 is a process flow diagram of aspect method for generating pseudo instructions and moving entire sequences of computations to alternative pipelines in the presence of register spillover.

FIG. 5 illustrates an aspect method 500 for generating pseudo instructions and moving entire sequences of computations to alternative pipelines in the presence of register spillover. In block 502, an instruction selector module of a static or runtime compiler may select special pseudo instructions instead of conventional instructions (i.e., CPU pipeline instructions) for operations that can legally be performed on an alternative pipeline (e.g., SIMD pipeline). In block 504, after the instruction selection stage, the compiler may use the DEF/USE or USE/DEF information generated in the compilation process to identify chains of dependent operations which could be performed on the SIMD pipe (e.g., identify the chains of operations that are linked together and which may be performed together in a SIMD pipe). In block 506, the compiler may compute the expected costs (e.g., in terms of performance, power savings, etc.) associated with processing the chains of operations on the SIMD pipe. Also in block 506, the complier may calculate a cost of performing the operations on the main pipeline. In an aspect, as part of block 506, the compiler may also determine whether the costs of moving the chain of operations to the SIMD pipe will be less than the performance and power drain costs of using register spill to execute the chain of operations on the main pipe.

In block 508, the register allocation process of the compiler may select the pipeline on which the operation chains are to be executed based upon their computed costs. In block 510, the register allocator may discover the points in the execution of compiled code at which there will be more simultaneously live values than there are architectural registers. In block 512, the register allocator may determine whether any of the live values are associated with or part of a candidate chain of operations (i.e., a chain of operations which can be executed on either the main pipe or the SIMD pipe) at each point where the live values exceeds the available registers. If any live values are associated with a candidate chain of operations, the allocator may use the computed costs of moving the operations to the SIMD pipe, or the relative costs of performing operations on the SIMD pipe versus the main pipe, in order to choose the best chain of operations (in terms of total costs or cost savings) for relocation to the SIMD pipe. In block 514, chains of operations chosen to be shifted to the SIMD pipe may be moved to that pipeline by tagging the values and resetting their legal register set to that of the SIMD registers.

In determination block 516, the compiler may determine if all the SIMD registers are fully subscribed. If it is determined that all the SIMD registers are fully subscribed (i.e., determination block 516="Yes"), in block 518, a conventional register spill solution may be used to store the values in a memory. If it is determined that all the SIMD registers are not fully subscribed (i.e., determination block 516="No"), in block 520 the compiler may determine if there are any more candidate chains for processing. If it is determined that there are more candidate chains for processing (i.e., determination block 520="Yes"), in block 512, the register allocator may determine whether any of the live values are associated with or part of a candidate chain of operations. If it is determined that there are no more candidate chains for processing (i.e., determination block 520="No"), in determination block 522, the compiler may determine if there are additional points for evaluation. If there are additional points for evaluation (i.e., determination block 522="Yes"), in block 510, the register allocator may discover and select more points where there are more simultaneously live values than there are registers available. Once all points have been evaluated (i.e., determination block 522="No"), the compiler may move on to other compiler routines in block 524.

These processes for choosing chains of operations to be moved to the SIMD pipeline may be repeated for other values associated with candidate chains of operations in order to move more chains of operations to the SIMD pipe, thereby further reducing pressure on the registers. These processes may be repeated until the pressure on the registers is relieved, such that the number of simultaneously live values in the main pipe is less than the number of available registers. Also, these processes may be repeated all registers in the SIMD registers are fully subscribed.

Figure 6:
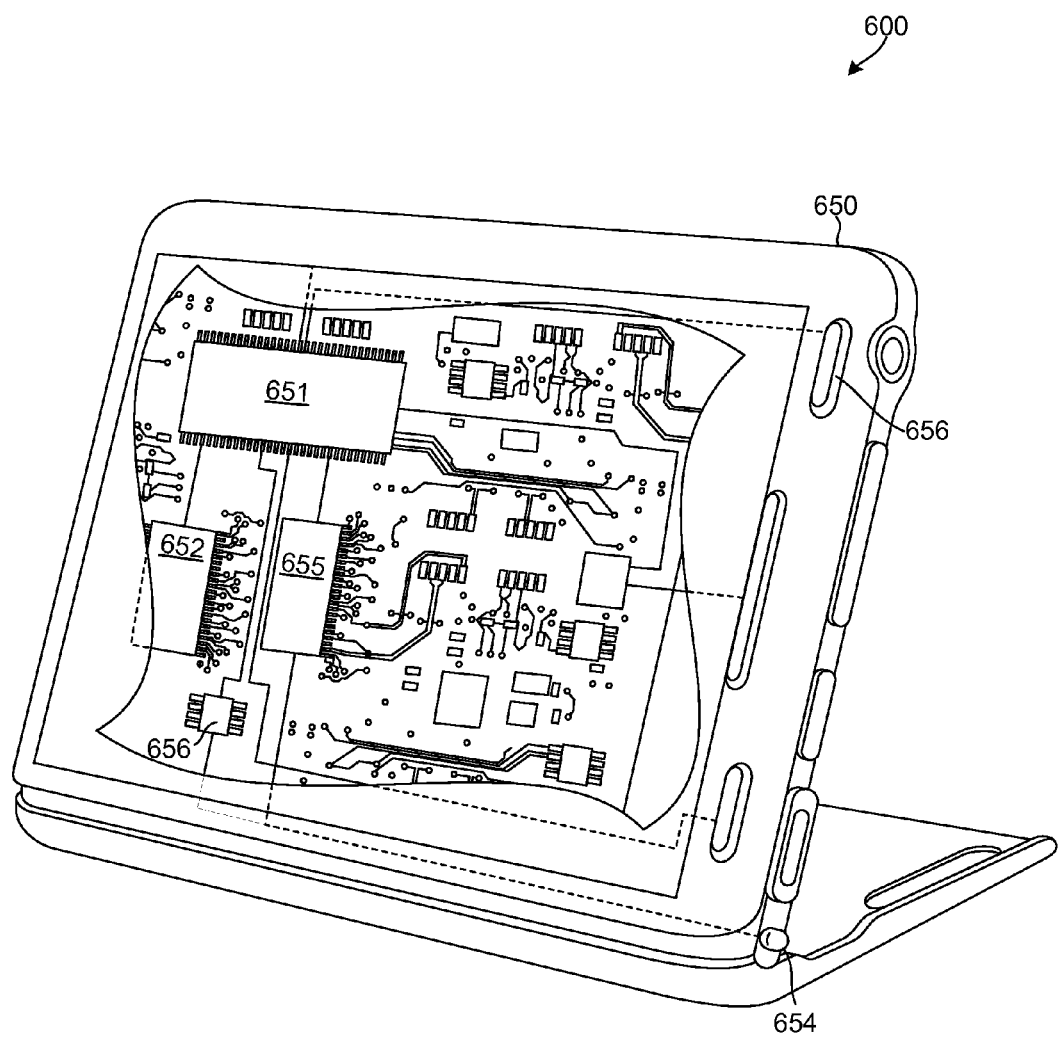
FIG. 6 is a component block diagram of a mobile device suitable for use with the various aspects.

Typical mobile devices 600 suitable for use with the various aspects will have in common the components illustrated in FIG. 6. For example, an exemplary mobile receiver device 600 may include a processor 651 coupled to internal memory 652, a display 650, and to a speaker 656. Additionally, the mobile device 600 may have an antenna 654 for sending and receiving electromagnetic radiation that is connected to a mobile multimedia receiver 655 coupled to the processor 651. In some aspects, the mobile multimedia receiver 655 may include an internal processor, such as a digital signal processor (DSP) for controlling operations of the receiver 655 and communicating with the device processor 651. Mobile devices typically also include a key pad or miniature keyboard, and menu selection buttons or rocker switches for receiving user inputs.

The processor 651 may be any programmable microprocessor, microcomputer or multiple processor chip or chips that can be configured by processor-executable software instructions (applications) to perform a variety of functions, including the functions of the various aspects described herein. Typically, software applications and processor-executable instructions may be stored in the internal memory 652 before they are accessed and loaded into the processor 651. The processor 651 may include internal memory sufficient to store the application software instructions. In some mobile devices, a secure memory 656 may be in a separate memory chip coupled to the processor 651. In many mobile devices 600, the internal memory 652 may be a volatile or nonvolatile memory, such as flash memory, or a mixture of both. For the purposes of this description, a general reference to memory refers to all memory accessible by the processor 651, including internal memory 652, removable memory plugged into the mobile device, and memory within the processor 651 itself.

Figure 7:
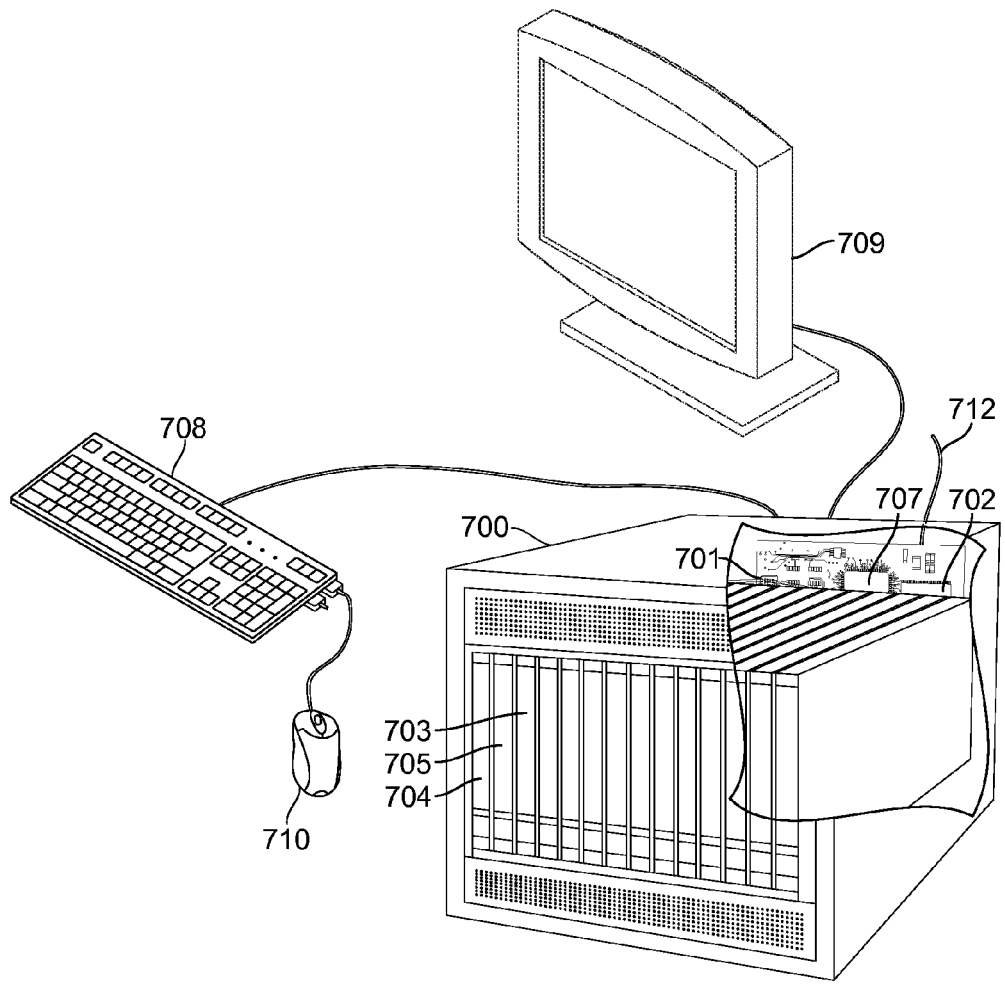
FIG. 7 is a component block diagram of a work station suitable for use with the various aspects.

The various aspects involving static compilers may be implemented on any of a variety of commercially available computers, servers and/or work stations, such as the work station 700 illustrated in FIG. 7. Such a work station 700 typically includes a processor 701 coupled to volatile memory 702 and a large capacity nonvolatile memory, such as a disk drive 703. The work station 700 may also include a floppy disc drive, compact disc (CD) or DVD disc drive 704 coupled to the processor 701. The work station 700 may also include network access ports 706 coupled to the processor 701 for establishing data connections with a network 712, such as a local area network coupled to other broadcast system computers and servers. Work stations 700 may also include operator interfaces, such as a keyboard 708, pointer device (e.g., a computer mouse 710), and a display 709.

The foregoing method descriptions and the process flow diagrams are provided merely as illustrative examples and are not intended to require or imply that the blocks of the various aspects must be performed in the order presented. As will be appreciated by one of skill in the art the order of blocks in the foregoing aspects may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the aspects disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), a DSP within a multimedia broadcast receiver chip, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The blocks of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A compiler method implemented within a compiler on a computing device, the method comprising:
   identifying operations that are capable of being performed on either a main pipe or an alternative pipe;
   identifying chains of dependent operations that are capable of being performed on either the main pipe or the alternative pipe;
   generating pseudo instructions, before performance of a register allocation process, that enable later generation of instructions capable of representing instructions for each of the main pipe and the alternative pipe during or after performance of the register allocation process;
   identifying points of execution at which a number of simultaneous live values will exceed a number of available registers in the main pipe;
   identifying live values associated with candidate chains of operations;
   choosing a chain of operations as a candidate to be moved to the alternative pipe based on relative costs of performing each chain of operations on the alternative pipe in order to reduce the number of simultaneous live values at identified points of execution that compete for registers in the main pipe; and
   generating actual instructions for the chosen chain of operations for execution on either the main pipe or the alternative pipe during or after performance of the register allocation process.

2. The method of claim 1, wherein generating instructions for the chosen chain of operations for execution on either the main pipe or the alternative pipe comprises generating instructions for the main pipe from the pseudo instructions.

3. The method of claim 1, wherein generating instructions for the chosen chain of operations for execution on either the main pipe or the alternative pipe comprises generating the actual instructions for the alternative pipe from the pseudo instructions.

4. The method of claim 1, further comprising:
   selecting an instruction set to be generated from the pseudo instructions as part of the register allocation process.

5. The method of claim 1, wherein the alternative pipe is a single instruction multiple data (SIMD) unit.

6. The method of claim 1, further comprising repeating operations of choosing a chain of operations to move to the alternative pipe until the number of simultaneous live values on the main pipe no longer exceeds the number of available registers in the main pipe.

7. A computing device, comprising:
   means for identifying operations that are capable of being performed on either a main pipe or an alternative pipe;
   means for identifying chains of dependent operations that are capable of being performed on either the main pipe or the alternative pipe;
   means for generating pseudo instructions, before performance of a register allocation process, that enable later generation of instructions capable of representing instructions for each of the main pipe and the alternative pipe during or after performance of the register allocation process;
   means for identifying points of execution at which a number of simultaneous live values will exceed a number of available registers in the main pipe;
   means for identifying live values associated with candidate chains of operations;
   means for choosing a chain of operations as a candidate to be moved to the alternative pipe based on relative costs of performing each chain of operations on the alternative pipe in order to reduce the number of simultaneous live values at identified points in of execution which compete for registers in the main pipe; and
   means for generating actual instructions for the chosen chain of operations for execution on either the main pipe or the alternative pipe during or after performance of the register allocation process.

8. The computing device of claim 7, wherein means for choosing a chain of operations as a candidate to be moved to the alternative pipe in order to reduce the number of simultaneous live values at identified points in of execution which compete for registers in the main pipe comprises means for generating instructions for the main pipe from the pseudo instructions.

9. The computing device of claim 7, wherein means for choosing a chain of operations as a candidate to be moved to the alternative pipe in order to reduce the number of simultaneous live values at identified points in of execution which compete for registers in the main pipe comprises means for generating the actual instructions for the alternative pipe from the pseudo instructions.

10. The computing device of claim 7, further comprising:
    means for selecting an instruction set to be generated from the pseudo instructions as part of the register allocation process.

11. The computing device of claim 7, wherein means for choosing a chain of operations as a candidate to be moved to the alternative pipe comprises means for choosing a chain of operations as a candidate to be moved to a single instruction multiple data (SIMD) unit.

12. The computing device of claim 7, further comprising means for repeating operations of choosing a chain of operations to move to the alternative pipe until the number of simultaneous live values on the main pipe no longer exceeds the number of available registers in the main pipe.

13. A computing device, comprising:
    a memory; and
    a processor coupled to the memory, wherein the processor is configured with processor-executable instructions to perform operations comprising:
       identifying operations that are capable of being performed on either a main pipe or an alternative pipe;
       identifying chains of dependent operations that are capable of being performed on either the main pipe or the alternative pipe;
       generating pseudo instructions, before performance of a register allocation process, that enable later generation of instructions capable of representing instructions for each of the main pipe and the alternative pipe during or after performance of the register allocation process;

identifying points of execution at which a number of simultaneous live values will exceed a number of available registers in the main pipe;

identifying live values associated with candidate chains of operations;

choosing a chain of operations as a candidate to be moved to the alternative pipe based on relative costs of performing each chain of operations on the alternative pipe in order to reduce the number of simultaneous live values at identified points of execution which compete for registers in the main pipe; and generating actual instructions for the chosen chain of operations for execution on either the main pipe or the alternative pipe during or after performance of the register allocation process.

14. The computing device of claim 13, wherein generating instructions for the chosen chain of operations for execution on either the main pipe or the alternative pipe comprises generating instructions for the main pipe from the pseudo instructions.

15. The computing device of claim 13, wherein generating instructions for the chosen chain of operations for execution on either the main pipe or the alternative pipe comprises generating the actual instructions for the alternative pipe from the pseudo instructions.

16. The computing device of claim 13, wherein the processor is configured with processor-executable instructions to perform operations further comprising:

selecting an instruction set to be generated from the pseudo instructions as part of the register allocation process.

17. The computing device of claim 13, wherein the processor is configured with processor-executable instructions such that generating instructions for the chosen chain of operations for execution on either the main pipe or the alternative pipe comprises generating instructions for the chosen chain of operations for a single instruction multiple data (SIMD) unit.

18. The computing device of claim 13, wherein the processor is configured with processor-executable instructions to perform operations further comprising repeating operations of choosing a chain of operations to move to the alternative pipe until the number of simultaneous live values on the main pipe no longer exceeds the number of available registers in the main pipe.

19. A non-transitory computer readable storage medium having stored thereon processor-executable instructions configured to cause a processor to perform operations comprising:

identifying operations that are capable of being performed on either a main pipe or an alternative pipe;

identifying chains of dependent operations that are capable of being performed on either the main pipe or the alternative pipe;

generating pseudo instructions, before performance of a register allocation process, that enable later generation of instructions capable of representing instructions for each of the main pipe and the alternative pipe during or after performance of the register allocation process;

identifying points of execution at which a number of simultaneous live values will exceed a number of available registers in the main pipe;

identifying live values associated with candidate chains of operations;

choosing a chain of operations as a candidate to be moved to the alternative pipe based on relative costs of performing each chain of operations on the alternative pipe in order to reduce the number of simultaneous live values at identified points of execution which compete for registers in the main pipe; and generating actual instructions for the chosen chain of operations for execution on either the main pipe or the alternative pipe during or after performance of the register allocation process.

20. The non-transitory computer readable storage medium of claim 19, wherein generating instructions for the chosen chain of operations for execution on either the main pipe or the alternative pipe comprises generating instructions for the main pipe from the pseudo instructions.

21. The non-transitory computer readable storage medium of claim 19, wherein generating instructions for the chosen chain of operations for execution on either the main pipe or the alternative pipe comprises generating the actual instructions for the alternative pipe from the pseudo instructions.

22. The non-transitory computer readable storage medium of claim 19, wherein the stored processor-executable instructions are configured to cause a processor to perform operations comprising:

selecting an instruction set to be generated from the pseudo instructions as part of the register allocation process.

23. The non-transitory computer readable storage medium of claim 19, wherein the stored processor-executable instructions are configured to cause a processor to perform operations such that generating instructions for the chosen chain of operations for execution on either the main pipe or the alternative pipe comprises generating instructions for the chosen chain of operations for execution on a single instruction multiple data (SIMD) unit.

24. The non-transitory computer readable storage medium of claim 19, wherein the stored processor-executable instructions are configured to cause a processor to perform operations comprising repeating operations of choosing a chain of operations to move to the alternative pipe until the number of simultaneous live values on the main pipe no longer exceeds the number of available registers in the main pipe.

* * * * *